United States Patent [19]

Takakubo et al.

[11] Patent Number: 4,818,646
[45] Date of Patent: Apr. 4, 1989

[54] POLYPYRROLE FILM AND METHOD OF PRODUCING THE SAME

[75] Inventors: Masaaki Takakubo; Toshiyuki Ohsawa, both of Tokyo, Japan

[73] Assignee: Ricoh Company, Ltd., Tokyo, Japan

[21] Appl. No.: 915,000

[22] Filed: Oct. 3, 1986

[30] Foreign Application Priority Data

| Oct. 3, 1985 | [JP] | Japan | 60-219113 |
| Dec. 4, 1985 | [JP] | Japan | 60-271550 |
| Feb. 28, 1986 | [JP] | Japan | 61-41686 |
| Aug. 4, 1986 | [JP] | Japan | 61-183158 |

[51] Int. Cl.$^4$ .................. H01M 4/60; C25B 3/00
[52] U.S. Cl. ........................... 429/213; 429/212; 204/59 R; 204/72; 252/518
[58] Field of Search ............. 429/212, 213; 204/59 R, 204/72; 252/518

[56] References Cited

U.S. PATENT DOCUMENTS

| 4,321,114 | 3/1982 | MacDiarmid et al. | 429/213 |
| 4,547,270 | 10/1985 | Naarmann | 204/180.2 |
| 4,559,112 | 12/1985 | Tamamura et al. | 204/59 R |
| 4,587,037 | 5/1986 | Munstedt et al. | 252/518 |
| 4,640,749 | 2/1987 | Naarmann et al. | 204/59 R |

FOREIGN PATENT DOCUMENTS

| 0130895 | 1/1985 | European Pat. Off. | |
| 0119629 | 9/1979 | Japan | 429/213 |

OTHER PUBLICATIONS

Myers, R. E., "Chemical Oxidative Polymerization as a Synthetic Route to Electrically Conducting Polypyrroles", J. Electron. Mater., 15(2), 61–9, 1986.

*Primary Examiner*—John F. Niebling
*Assistant Examiner*—Steven P. Marquis
*Attorney, Agent, or Firm*—Oblon, Fisher, Spivak, McClelland & Maier

[57] ABSTRACT

A film of polypyrrole doped with a transition metal complex anion having a higher oxidation number of a redox couple consisting of transition metal complex anions and a method of producing the polypyrrole film by electrochemical polymerization are disclosed.

20 Claims, 2 Drawing Sheets

POLYPYRROLE FILM AND METHOD OF PRODUCING THE SAME

BACKGROUND OF THE INVENTION

The present invention relates to a polypyrrole film and a method of producing the same.

A method of synthesizing polypyrrole film is reported in J. Chem. Soc., Chem Comm., 1979, 635.

Further, with respect to polymerization of pyrrole, it is reported by K. C. Khulbe and R. S. Mann in J. Polym. Sci.: Polym. Chem. Ed. Vol. 20, pages 1089 to 1095, 1982, that pyrrole can be polymerized in an aqueous solution in the presence of potassium persulfate. The polypyrrole obtained by this method is in the form of powder.

In Japanese Laid-Open Patent Application No. 59-226020, there is described a method of electrochemically polymerizing pyrrole in an aqueous organic solvent in the presence of organic sulfonic acids. In the aqueous organic solvent employed in this method, at least 50 wt. % of water is contained. It is preferable to use only water in view of the cost and safety in the polymerization for industrial purpose.

In J. Am. Chem. Soc. Vol. 106, pages 6861 to 6863, 1984, it is reported by Baruch Zinger and Larry L. Miller that polypyrrole is obtained by anodic oxidation in an aqueous solution by using ferrocyanide ion ($Fe(CN)_6^{4-}$) as dopant.

Although several methods of preparing such electroconductive polypyrrole films are known, a method of obtaining a self-standing polypyrrole film in an aqueous solution, which can be easily peeled off the anode for anodic oxidation, has not been reported yet.

Other electroconductive polymer films, such polythiophene, polyfuran, polyazulene, poly p-phenylene, and polyaniline films, are reported in the following references: Polythiophene and polyfuran in J. Electroanal. Chem., 135, 173(1982), polyazulene in IBM. J. Res. Develop., 27, 330(1983), poly p-phenylene in J. Chem. Soc., Chem. Comm., 1984, 1199, and polyaniline in J. Electroanal. Chem. 111(1980).

Recently many trials of using these electroconductive films, for instance, as the materials for electronics equipment are conducted. In the course of such trials, there is a great demand for large-size electroconductive polymer films. However, it is difficult to prepare an electroconductive polymer film having an uniform thickness and a large size by electrochemical polymerization. In the case of a polypyrrole film prepared by electrochemical polymerization, the maximum size so far obtained is about 20 cm×20 cm. It is extremely difficult to obtain a polypyrrole film larger than this size by the conventional methods.

SUMMARY OF THE INVENTION

It is therefore an object of the present invention to provide a polypyrrole film which is dense and nonporous and has such high mechanical strength as to have a self-standing property suitable for use in practice, and a method of producing the same.

Another object of the present invention is to provide a polypyrrole film having high electric conductivity, and a method of producing the same.

A further object of the present invention is to provide a polypyrrole film which is large in size, and a method of producing the same.

The above-mentioned first and second objects of the present invention are attained by a polypyrrole film which is doped with a transition metal complex anion having a higher oxidation number of a redox couple consisting of transition metal complex anions. Such polypyrrole film can be prepared by subjecting pyrrole, a pyrrole derivative, or a mixture of pyrrole and a pyrrole derivative to anodic oxidation in an aqueous solution in the presence of the transition metal complex anion having a higher oxidation number which serves as dopant. In particular, in order to obtain an electroconductive polypyrrole film, a cobalt complex anion and a chrome complex anion are preferable for use as such transition metal complex anion.

The third object of the present invention is attained by use of an improved anode, with the surface thereof being partially provided with a material having a smaller electric resistivity than that of the anode, in the above electrochemical polymerization. This anode can be employed for polymerization of thiophene, furan, aniline, benzene and azulene for obtaining a large-size polymer film made of such a monomer.

DETAILED DESCRIPTION OF THE PREFERRED EMBODIMENTS

Figure 1:
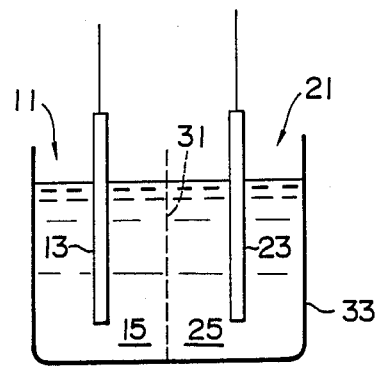
FIG. 1 is a schematic diagram in explanation of the structure of a secondary battery in which an electroconductive polypyrrole film according to the present invention is employed in a cathode thereof.

A polypyrrole film according to the present invention is doped with a transition metal complex anion having a higher oxidation number of a redox couple consisting of transition metal complex anions.

Such polypyrrole film can be prepared by subjecting pyrrole, a pyrrole derivative or a mixture of pyrrole and a pyrrole derivative to anodic oxidation in an aqueous solution in the presence of a transition metal complex anion having a higher oxidation number, thereby electrochemically polymerizing pyrrole or pyrrole derivatives, preferably on a flat anode.

The above employed transition metal complex anion serves not only as a charge carrier in the electrochemical polymerization in the aqueous solution, but also as a dopant of the obtained polypyrrole. Therefore, it has significant effects particularly on the electrical and mechanical properties of the polypyrrole.

The electroconduction mechanism of the electroconductive polypyrrole is generally explained by use of a hopping model in which the electroconduction in ploypyrrole is determined by the hopping of charge carriers between adjacent polypyrrole chains. According to this hopping model, when a dopant has a function of transferring and receiving electrons, namely a redox function, the electroconductive of the polypyrrole is facilitated.

According to the present invention, a self-standing polypyrrole film which can be easily peeled off the anode can be obtained Representative examples of a redox couple of transition metal complex ions for use in the present invention are as follows:

$Cr(CN)_6^{3-}/Cr(CN)_6^{4-}$, $Cr(ox)_3^{3-}/Cr(ox)_3^{4-}$ (ox: oxalate), $Cr(edta)^-/Cr(edta)^{2-}$ (edta ethylenediaminetetraacetate), $Cr(mal)_3^{3-}/Cr(mal)_3^{4-}$ (mal: malonate), $Mn(CN)_6^{3-}/Mn(CN)_6^{4-}$, $Mn(edta)^-/Mn(edta)^{2-}$, $Fe(CN)_6^{3-}/Fe(CN)_6^{4-}$, $Fe(edta)^-/Fe(edta)^2$, $Fe(cat)_3^{3-}/Fe(cat)_3^{4-}$ (cat: catecholate) $Co(CN)_6^{3-}/Co(CN)_6^{4-}$, $Co(edta)^-/Co(edta)^{2-}$, $Co(pdta)^-/Co(pdta)^{2-}$ (pdta: propylenediaminetetraacetate), $Co(cydta)^-/Co(cydta)^{2-}$ (cydta: 1,2-cyclohexanediamine-N,N,N',N'-tetraacetate), $Co(tnta)^-/Co(tnta)^{2-}$ (tnta: trimethylenediaminetetraacetate), $Co(ata)(CO_3)^{2-}/Co(ata)(CO_3)^{3-}$ (ata: nitrilotriacetate), $Co(gly)(ata)^-/Co(gly)(ata)^{2-}$ (gly: glycine), $CoCl(edta)^{2-}/CoCl(edta)^{3-}$, $Co(NO_2)(edta)^{2-}/Co(NO_2)(edta)^{3-}$, $Co(edta)(ox)^-/Co(edta)(ox)^{2-}$, $Co(edtp)^-/Co(edtp)^{2-}$ (edtp: ethylenediaminetetrapropionate), $Co(tnta)^-/Co(tnta)^{2-}$ (tnta: trimethylenediaminetetraacetate), $Co(glygly)^{2-}/Co(glygly)_2^{2-}$ (glygly: glycylglycinate) $Co(mal)_3^{3-}/Co(mal)_3^{4-}$, $Co(dtpa)^{2-}/Co(dtpa)^{3-}$ (dtpa: diethylenetriaminepentaacetate), $Ti(cat)_3^{2-}/Ti(cat)_3^{3-}$, $Cu(pdta)^{2-}/Cu(pdta)^{3-}$, $Cu(glygly)^{2-}/Cu(glygly)^{3-}$, $Mo(CN)_8^{3-}/Mo(CN)_8^{4-}$, $W(CN)_8^{3-}/W(CN)_8^{4-}$, amd $WCl_5^-/WCl_5^{2-}$.

In the above redox couples, tris(oxalato)chromate anion, $Cr(ox)_3^{4-}$ (ox: oxalate), is particularly preferable for use as the dopant for obtaining an electroconductive polypyrrole film.

In the electrochemical polymerization according to the present invention, it is preferable that the concentration of dopant be in the range of 0.001 to 1 gram equivalent/l, more preferably in the range of 0.05 to 0.2 gram equivalent/l.

As a counter cation for the above dopants, alkali metal ions are preferably employed. Of the alkali metal ions, $K^+$ and $Na^+$ are most preferably employed.

In the electrochemical polymerization according to the present invention, pyrrole is preferably employed. In addition to pyrrole, the following pyrrole derivatives can also be employed: 3-methylpyrrole, 3-ethylpyrrole, 3-n-propylpyrrole, 3-n-butylpyrrole, 3-decylpyrrole, 3-benzylpyrrole, 3-cyclohexylpyrrole, 3-methoxypyrrole, 3-ethoxypyrrole, 3,4-dimethylpyrrole, 3,4-diethylpyrrole, 3,4-di-n-propylpyrrole, 3,4-didodecylpyrrole, 3,4-dipropoxypyrrole, 3,4-difurylpyrrole, N-methylpyrrole, N-ethyl pyrrole, N-n-propylpyrrole, N-n-butylpyrrole, N-phenylpyrrole, N-(p-tolyl)pyrrole, 3-chloropyrrole, 3-bromopyrrole, 3-iodopyrrole, 3,4-dichloropyrrole, 3,4-dibromopyrrole, and 3,4-diiodopyrrole.

The above pyrrole derivatives can also be employed as co-monomers which are employed in combination with pyrrole for preparation of a polypyrrole film.

In the electrochemical polymerization, it is preferable that the amount of the entire monomers be in the range of 0.001 to 0.5 moles/l, more preferably in the range of 0.01 to 0.2 moles/l. When any of the above polypyrrole derivatives is employed as co-monomer, it is preferable that the amount of the co-monomer be in the range of 1 to 25 wt. % of the entire monomers.

In the electrochemical polymerization of pyrrole and the above pyrrole derivatives according to the present invention, water is employed as solvent.

The polymerization can be performed in an ordinary electrolytic cell or in an apparatus for electrolysis. The use of a separator for separating the anode and the cathode in the electrochemical polymerization is a matter of choice. In order to maintain the anode potential accurately during the electrochemical polymerization, an apparatus for electrolysis provided with a reference electrode can also be used. As the materials for the electrodes employed in the electrochemical polymerization, conventional inert materials for electrodes, for instance, gold, platinum, nickel, copper and carbon, can be employed. In addition to the above, electroconductive Nesa glass can also be employed as the material for the electrodes.

The electrochemical polymerization according to the present invention is usually performed at room temperature. However, the polymerization reaction temperature can be varied between the freezing point and the boiling point of the solution for the reaction.

When tris(oxalato)chromate ion is used as dopant, it is preferable that the reaction temperature be set between the freezing point of the solution for the reaction and 0(zero)° C. in order to obtain a polypyrrole film having high electric conductivity. In this case, it is preferable to employ the above-mentioned apparatus for electrolysis provided with a reference electrode.

In the electrochemical polymerization according to the present invention, it is preferable that the difference in the potential between the anode and the cathode be 6V or less, more preferably 3.0V or less. The polymerization reaction can be performed by any of the conventional methods, for instance, the potentio-static method, the galvano-static method and the constant-voltage method.

As mentioned above, when tris(oxalato)chromate ion is used as dopant, it is preferable that an apparatus for electrolysis provided with a reference electrode be employed in order to maintain the potential for anodic oxidation accurately at a predetermined value during the polymerization. In this case, when a saturated calomel electrode is employed as the reference electrode, it is preferable that the difference in the potential between the anode and the reference electrode be about +0.75V or less or slightly greater than the potential necessary for the initiation of the oxidation of pyrrole or pyrrole derivatives in the reaction solution.

The reaction time mainly depend upon the employed dopant, the reaction conditions and the desired thickness of a polymer film. Normally the reaction time ranges from 1 hour to several hours. The thickness of a polymer film increases in accordance with the duration of the polymerization. For instance, when the polymerization is continued for 3 hours, the obtained film usually becomes 50 to 60 μm thick. As a matter of course, this thickness range does not mean the upper limit of the thickness of the obtained polymer film.

After the termination of the polymerization reaction, the polypyrrole deposited in the form of a film on the anode is washed with water to removed unreacted materials. The deposited polypyrrole film can be easily peeled off the anode. The polypyrrole film is then dried at room temperature and atmospheric pressure. The thus obtained polypyrrole film has an excellent self-standing mechanical strength, a uniform smooth surface and an electroconductivity of 5 $Scm^{-1}$ or more.

When tris(oxalato)chrome ion is employed as dopant, the obtained electric conductivity is as high as about 100 $Scm^{-1}$.

In the electrochemical polymerization according to the present invention, when an improved anode is employed which is partially provided at the surface thereof with a material having an electric resistivity smaller than that of the anode itself, the uniformity of the distribution of the potential or electric current at the surface of the anode is improved, so that a polypyrrole film of a large size which cannot be obtained conventionally can be obtained. The polypyrrole film obtained by use of the anode has high self-standing property and a uniform thickness and can be easily peeled off the anode.

As mentioned above, the anode for obtaining such a large size polypyrrole film is partially provided with a material having an electric resistivity smaller than that of the anode itself. When the anode is rectangular, a material having low resistivity is applied to the entire or part of the four sides of the anode, or to the surface of the anode in the form of a network or in the form of dots.

The low resistivity material can be applied to the anode by any conventional methods, for instance, vacuum evaporation of metals or metal oxides, and application of a paste-like electroconductive epoxy resin composition. As such metals, for instance, gold and platinum can be employed, and as such metal oxides, for example, indium oxide and tin oxide can be employed.

The electrochemical polymerization method by use of the above improved anode is not limited to the polymerization of pyrrole and pyrrole derivatives using water as solvent, and water-soluble electrolyte ions, but it can be applied to the polymerization of other monomers, for example, thiophene, furan, aniline, benzene and azulene, using the following organic solvents and the following organic-solvent-soluble electrolyte ions.

Examples of such organic solvents are diethyl ether, tetrahydrofuran, 1,4-dioxane, acetonitrile, propionitrile, butylonitrile, i-butylonitrile, benzonitrile, benzylnitrile, formamide, N-methylformamide, dimethylformaiide, N-methylacetoamide, dimethylacetoamide, hexamethylphosphoramide, N-methylpyrrolidone, pyridine, dimethylsulfoxide, nitromethane, nitrobenzene, propylene carbonate, 1,2-dimethoxyethane, methylchloride, acetone, and sulfolane.

Examples of such organic-solvent-soluble electrolyte ions are p-toluene sulfonate ion, $ClO_4^-$, $BF_4^-$, $AsF_6^-$, $PF_6^-$, $CF_3SO_3^-$ and oxalate.

When this improved anode is employed, self-standing polymer films of a size larger than 25 cm×25 cm can be prepared.

The polypyrrole film according to the present invention and the above polymer films can be used in a variety of fields, for instance, as the materials for semi-conductors, electrochromic materials, electromagnetic interference materials, solar batteries and secondary batteries.

In particular, the large size electroconductive self-standing polymer films are suitable for the materials for semi-conductors, electrochromic materials, and electromagnetic interference materials.

FIG. 1 shows an example of a secondary battery in which a polypyrrole film according to the present invention is employed as a material for a cathode of the battery.

In the figure, reference numeral 11 indicates a cathode system and reference numeral 21 indicates an anode system. Reference numerals 13 and 23 respectively indicate a cathode and an anode. Reference numeral 15 indicates an electrolytic aqueous solution in the cathode system 11, and reference numeral 25 indicates an electrolytic aqueous solution in the anode system 21.

The advantages of the secondary battery using the polypyrrole film with an aqueous electrolyte are safe in handling and inexpensive, because the polypyrrole film is not affected by oxygen and water and therefore water can be employed as the solvent in the battery, and has a long life.

The present invention will now be explained in detail with reference to the following examples. The present invention is not limited to those examples.

EXAMPLE 1

0.01 gram equivalent of a dopant given in Table 1, and 0.006 moles of pyrrole were dissolved in water, with stirring, in a 200 ml beaker, to prepare 100 ml of of an aqueous solution of the two components.

An anode made of a Nesa glass plate having a surface resistivity of 85 $\Omega cm^{-2}$ with the dimensions of 3 cm×3 cm×0.1 cm, a cathode made of a nickel plate with the dimensions of 3 cm×3 cm×0.05 cm, and a silver—silver chloride electrode serving as a reference electrode were immersed in the above solution. The Nesa glass plate and the nickel plate were respectively connected to a positive electrode and a negative electrode of a potentiostat through copper wires.

The potential at the positive electrode was set so as to be higher than that of the reference electrode by +1.4 V. Under these conditions, an electric current was caused to flow at room temperature for 180 minutes and electrochemical polymerization of pyrrole was performed so as to deposit polypyrrole on the surface of the anode.

After the termination of the polymerization reaction, the deposited polypyrrole was peeled off the anode, washed with water, and dried at room temperature and atmospheric pressure, whereby a polypyrrole film No. 1 according to the present invention, which had an uniformly smooth surface, was obtained.

The electric conductivity of the obtained polypyrrole film measured by the conventional four-probe method and the tensile strength of the film are given in Table 1.

EXAMPLE 2

Example 1 was repeated except that the dopant employed in Example 1 was replaced by a dopant shown in Table 1, whereby a polypyrrole film No. 2 according to the present invention was obtained.

The electric conductivity and the tensile strength of the polypyrrole film No. 2 were as shown in Table 1.

TABLE 1

| Examples | Dopant Anion | Counter Cation | Electric Conductivity (Scm$^{-1}$) | Tensile Strength (Kg·cm$^{-2}$) |
|---|---|---|---|---|
| No. 1 | Co(edta)$^-$ | K$^+$ | 16 | 230 |
| No. 2 | Co(pdta)$^-$ | K$^+$ | 13 | 200 |

EXAMPLE 3

Example 1 was repeated except that the dopant employed in Example 1 was replaced by ferricyanide ion, [Fe(CN)$_6$]$^{3-}$, whereby a polypyrrole film No. 3 according to the present invention was prepared.

The electric conductivity of the polypyrrole film was 20 Scm$^{-1}$ and the tensile strength thereof was 190 kg·cm$^{-1}$.

EXAMPLE 4

Example 1 was repeated except that the dopant employed in Example 1 was replaced by a dopant shown in Table 2, whereby a polypyrrole film No. 4 according to the present invention was obtained.

The electric conductivity and the tensile strength of the polypyrrole film No. 4 were as shown in Table 2.

EXAMPLE 5

Example 1 was repeated except that the dopant employed in Example 1 was replaced by a dopant shown in Table 2, whereby a polypyrrole film No. 5 according to the present invention was obtained.

The electric conductivity and the tensile strength of the polypyrrole film No. 5 were as shown in Table 2.

TABLE 2

| Examples | Dopant Anion | Counter Cation | Electric Conductivity ($Scm^{-1}$) | Tensile Strength ($Kg \cdot cm^{-2}$) |
|---|---|---|---|---|
| No. 4 | $Cr(ox)_3^{3-}$ | $K^+$ | 30 | 200 |
| No. 5 | $Cr(edta)(H_2O)^-$ | $K^+$ | 5 | 190 |

EXAMPLE 6

0.01 gram equivalent of potassium tris(oxalato) chromate synthesized by a conventional method and 0.006 moles of pyrrole were dissolved in water, with stirring, in a 200 ml beaker, to prepare 100 ml of an aqueous solution of the two components.

An anode made of an ITO glass plate having surface resistivity of $50\Omega cm^{-2}$ with the dimensions of $3 cm \times 3 cm \times 0.1 cm$, a cathode made of a platinum plate with the dimensions of $3 cm \times 3 cm \times 0.05 cm$, and a saturated calomel electrode serving as a reference electrode were immersed in the above solution. The ITO glass plate and the platinum plate were respectively connected to a positive electrode and a negative electrode of a potentiostat through copper wires.

The potential at the positive electrode was set so as to be higher than that of the reference electrode by $+0.75V$. The above polymerization system was placed in a bath equipped with a thermostat, so that the temperature of the entire system was maintained at $0°C$. Under these conditions, an electric current was caused to flow for 180 minutes and electrochemical polymerization of pyrrole was performed so as to deposit polypyrrole on the surface of the anode.

After the termination of the polymerization reaction, the deposited polypyrrole was peeled off the anode, washed with water, and dried at room temperature and atmospheric pressure, whereby a polypyrrole film No. 6 according to the present invention, which had an uniformly smooth surface, was obtained.

The electric conductivity of the obtained polypyrrole film measured by the conventional four-probe method was $100 Scm^{-1}$ and the tensile strength of the film was $240 kg.cm^{-2}$.

EXAMPLE 7

Example 6 was repeated except that as the anode, an ITO glass place having a surface resistivity of $100\Omega cm^{-2}$ instead of the ITO glass plate having a surface resistivity of $50\Omega cm^{-2}$ and that the potential at the positive electrode was set so as to be higher than that of the reference electrode by $+1.0V$ instead of $+0.75V$, whereby a polypyrrole film No. 7 according to th present invention was prepared.

The electric conductivity of the polypyrrole film was $51 Scm^{-1}$ and the tensile strength of the film was $231 kg.cm^{-2}$.

EXAMPLE 8

Example 6 was repeated except that as the anode, an ITO glass place having a surface resistivity of $100\Omega cm^{-2}$ instead of the ITO glass plate having a surface resistivity of $50\Omega cm^{-2}$, the potential at the positive electrode was set so as to be higher than that of the reference electrode by $+1.0V$ instead of $+0.75V$, and the polymerization was performed at $10°C$. instead of $0°C$., whereby a polypyrrole film No. 8 according to the present invention was prepared.

The electric conductivity of the polypyrrole film was $33 Scm^{-1}$ and the tensile strength of the film was $225 kg.cm^{-2}$.

EXAMPLE 9

Example 6 was repeated except that as the anode, an ITO glass place having a surface resistivity of $100\Omega cm^{-2}$ instead of the ITO glass plate having a surface resistivity of $50 \Omega cm^{-2}$, the potential at the positive electrode was set so as to be higher than that of the reference electrode by $+1.0V$ instead of $+0.75V$, and the polymerization was performed at $25°C$. instead of $0°C$., whereby a polypyrrole film No. 9 according to the present invention was prepared.

The electric conductivity of the polypyrrole film was $23 Scm^{-1}$ and the tensile strength of the film was $230 kg.cm^{-2}$.

EXAMPLE 10

Example 6 was repeated except that as the anode, an ITO glass place having a surface resistivity of $100\Omega cm^{-2}$ instead of the ITO glass plate having a surface resistivity of $50\Omega cm^{-2}$, the potential at the positive electrode was set so as to be higher than that of the reference electrode by $+1.0V$ instead of $+0.75V$, and the polymerization was performed at $40°C$. instead of $0°C$., whereby a polypyrrole film No. 10 according to the present invention was prepared.

The electric conductivity of the polypyrrole film was $12 Scm^{-1}$ and the tensile strength of the film was $235 kg.cm^{-2}$.

EXAMPLE 11

Example 6 was repeated except that as the anode, an ITO glass place having a surface resistivity of $100\Omega cm^{-2}$ instead of the ITO glass plate having a surface resistivity of $50\Omega cm^2$, the potential at the positive electrode was set so as to be higher than that of the reference electrode by $+1.0V$ instead of $+0.75V$, and the polymerization was performed at $50°C$. instead of $0°C$., whereby a polypyrrole film No. 11 according to the present invention was prepared.

The electric conductivity of the polypyrrole film was $9 Scm^{-1}$ and the tensile strength of the film was $228 kg.cm^{-2}$.

EXAMPLE 12

Example 6 was repeated except that the potential at the positive electrode was set so as to be higher than that of the reference electrode by $+1.0V$ instead of $+0.75V$, whereby a polypyrrole film No. 12 according to the present invention was prepared.

The electric conductivity of the polypyrrole film was 43 $Scm^{-1}$ and the tensile strength of the film was 224 $kg. cm^{-2}$.

EXAMPLE 13

Example 6 was repeated except that as the anode, an ITO glass place having a surface resistivity of 100$\Omega cm^{-2}$ instead of the ITO glass plate having a surface resistivity of 50$\Omega cm^{-2}$, whereby a polypyrrole film No. 13 according to the present invention was prepared.

The electric conductivity of the polypyrrole film was 67 $Scm^{-1}$ and the tensile strength of the film was 235 $kg.cm^{-2}$.

The reaction temperatures, and the electric conductivities and tensile strengths of the polypyrrole films obtained in Examples 6 through 13 are summarized in the following Table 3:

TABLE 3

| Examples | Reaction Temperature (°C.) | Electric Conductivity ($Scm^{-1}$) | Tensile Strength ($kg \cdot cm^{-2}$) |
| --- | --- | --- | --- |
| Ex. 6 | 0 | 100 | 240 |
| Ex. 7 | 0 | 51 | 231 |
| Ex. 8 | 10 | 33 | 225 |
| Ex. 9 | 25 | 23 | 230 |
| Ex. 10 | 40 | 12 | 235 |
| Ex. 11 | 50 | 9 | 228 |
| Ex. 12 | 0 | 43 | 224 |
| Ex. 13 | 0 | 67 | 235 |

EXAMPLE 14

2.51 of an aqueous solution containing (i) 0.25 gram equivalent of the dopant given in Table 3, and (ii) 0.15 moles of pyrrole was placed in a 3-1 glass container for electrolysis provided with (a) an anode made of an ITO glass plate with dimensions of 25 cm×25 cm×0.1 cm, having a surface resistivity of 100 $ohm.cm^{-2}$, with an epoxy-resin-based electroconductive sliver paste applied with a width of 0.5 cm to the peripheral surface of the ITO glass, and (b) a cathode made of a nickel plate having dimensions of 25 cm×25 cm×0.05 cm.

Electrochemical polymerization of the pyrrole was performed with a constant voltage of 2.5V applied between the anode and the cathode at room temperature for 480 minutes.

When the polymerization reaction was over, a polypyrrole film was deposited on the entire surface of the anode. The film was easily peeled off the anode, whereby a polypyrrole film No. 14 according to the present invention was obtained.

The size of the thus obtained polypyrrole film was as large as 25 cm×25 cm and the surface was uniformly smooth, which size was never obtained by the conventional electrochemical polymerization method.

The electric conductivity of the obtained polypyrrole film measured by the conventional four-probe method and the tensile strength of the film are given in Table 4.

EXAMPLE 15

Example 14 was repeated except that the dopant employed in Example 14 was replaced by a dopant shown in Table 4, whereby a polypyrrole film No. 15 according to the present invention was obtained.

The electric conductivity and the tensile strength of the polypyrrole film No. 15 were as shown in Table 4.

TABLE 4

| Examples | Dopant Anion | Counter Cation | Electric Conductivity ($Scm^{-1}$) | Tensile Strength ($Kg \cdot cm^{-2}$) |
| --- | --- | --- | --- | --- |
| No. 14 | Co(edta)$^-$ | $K^+$ | 16 | 230 |
| No. 15 | Co(pdta)$^-$ | $K^+$ | 13 | 200 |

EXAMPLE 16

Example 14 was repeated except that the dopant employed in Example 14 was replaced by a dopant shown in Table 4, whereby a polypyrrole film No. 16 according to the present invention was prepared.

The electric conductivity and the tensile strength of the polypyrrole film No. 16 were as shown in Table 5.

EXAMPLE 17

Example 14 was repeated except that the dopant employed in Example 14 was replaced by a dopant shown in Table 5, whereby a polypyrrole film No. 17 according to the present invention was prepared.

The electric conductivity and the tensile strength of the polypyrrole film No. 17 were as shown in Table 5.

TABLE 5

| Examples | Dopant Anion | Counter Cation | Electric Conductivity ($Scm^{-1}$) | Tensile Strength ($Kg \cdot cm^{-2}$) |
| --- | --- | --- | --- | --- |
| No. 16 | Cr(ox)$_3^{3-}$ | $K^+$ | 30 | 200 |
| No. 17 | Cr(edta)(H$_2$O)$^-$ | $K^+$ | 5 | 190 |

REFERENCE EXAMPLE 1

A saturated calomel electrode was incorporated in the container for electrochemical polymerization employed in Example 14.

In this container, 2.51 of an acetonitrile solution containing 0.25 moles of thiophene and 0.125 moles of tetrabutylammonium perchlorate was placed.

Electrochemical polymerization was performed in an atmosphere of argon with application of a constant voltage of 2.5V between the cathode and the anode at room temperature for 480 minutes.

As a result, a polythiophene film having a size of 25 cm×25 cm was deposited on the anode. The thus obtained polythiophene film had a uniform and smooth surface. The electric conductivity of the film was 60 $Scm^{-1}$ and the tensile strength thereof was 240 $kg.cm^{-2}$.

REFERENCE EXAMPLE 2

A polypyrrole film having a size of 1 cm×1 cm was made from the polypyrrole film obtained in Example 11.

In an aqueous electrolytic solution of potassium tris-(oxalato)chromate with a concentration of 0.1 gram equivalent per liter, the above polypyrrole film was immersed as a working electrode and a platinum plate was also immersed as a counter electrode. As a reference electrode, a saturated calomel electrode was immersed in the solution.

Under the above conditions, the electrochemical behavior of the polypyrrole film was investigated by cyclic voltammetry.

Figure 2:
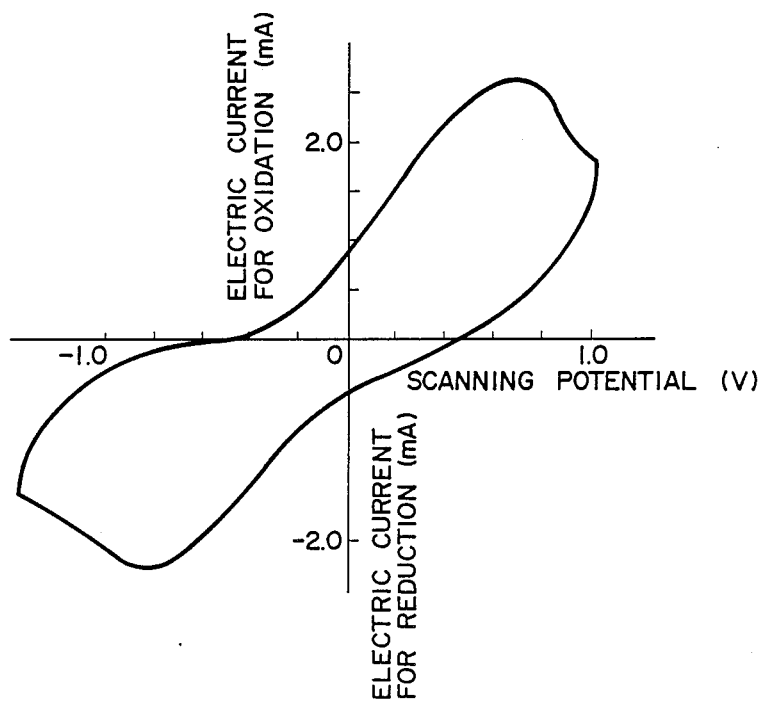
FIG. 2 is a cyclic voltammogram of a polypyrrole film doped with tris(oxalato)chrome ion, in which the scanning speed of the potential with respect to a saturated calomel electrode was 50 $mVs^{-1}$.

FIG. 2 shows a cyclic voltammogram of the polypyrrole film when the potential scanning speed was 50 mV.s$^{-1}$. The oxidation current having a peak at +0.65V corresponds to the doping of the polypyrrole film with tris(oxalato)chromate ion, while the oxidation current having a peak at −0.9V corresponds to the undoping of tris(oxalato)chromate ion from the polypyrrole film.

In other words, this polypyrrole film is capable of working as a cathode of a secondary battery having a half-wave potential of about −0.13V (with respect to a staturated calomel electrode).

REFERENCE EXAMPLE 3

A polypyrrole film doped with tris(oxalato)chromate ion, prepared in the same manner as in Reference Example 2, was immersed in an aqueous solution of potassium tris(oxalato)chromate with a concentration of 0.1 gram equivalent per liter, so that a cathode system was constructed.

Further, an anode system was constructed by immersing a zinc plate in an aqueous solution of zinc sulfate with a concentration of 0.1 mole/l.

The above cathode system and anode system were separated by a cation-exchange film which served as a separator, whereby a secondary battery was constructed.

Figure 3:
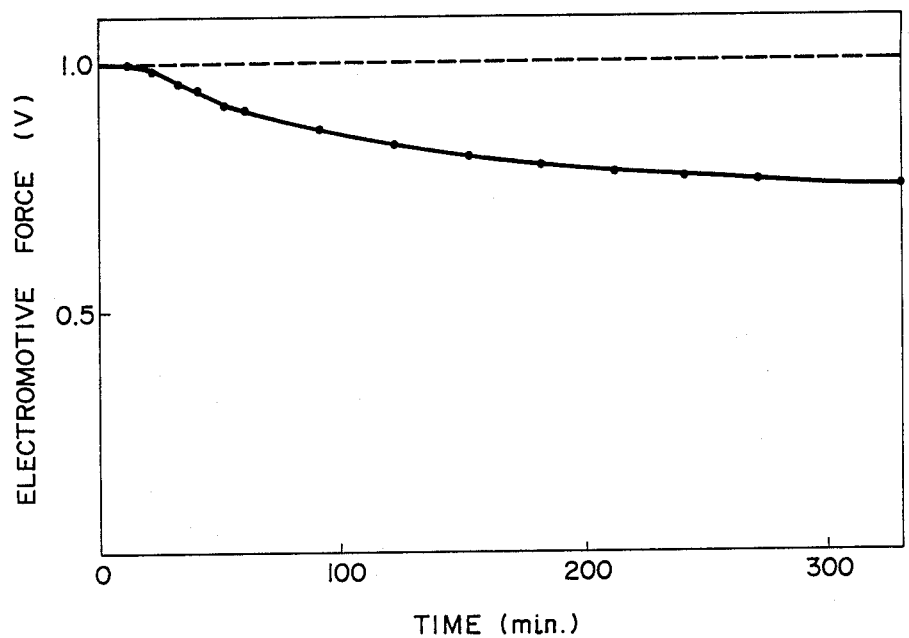
FIG. 3 is a diagram showing the changes in electromotive force of the secondary battery (shown in FIG. 1) with a function of time.

The changes in the electromotive force of this secondary battery with time at open circuits are shown by the broken line in FIG. 3. This indicates that this battery is free from self-discharge and excellent in the voltage stability.

The solid line in FIG. 3 indicates the changes in the electromotive force of this secondary battery with time when the battery was allowed to discharge with a constant current of 0.1 mA.

After charging and discharging were repeated, the above characteristics shown by the solid line and broken lines were almost the same, which indicates that this battery is stable in performance.

What is claimed is:

1. A film of polypyrrole doped with a transition metal complex anion having a higher oxidation number of a redox couple consisting of transition metal complex anions.

2. The film of polypyrrole as claimed in claim 1, wherein said polypyrrole is a polymer of pyrrole, a pyrrole derivative or a mixture thereof which is electrochemically polymerized by anodic oxidation on an anode in the presence of said transition metal complex anion having a higher oxidation number of a redox couple consisting of transition metal complex anions, and said pyrrole derivative being selected from the group consisting of 3-methylpyrrole, 3-ethylpyrrole, 3-n-propylpyrrole, 3-n-butylpyrrole, 3-decylpyrrole, 3-benzylpyrrole, 3-cyclohexylpyrrole, 3-methoxypyrrole, 3-ethoxypyrrole, 3,4-dimethylpyrrole, 3,4-diethylpyrrole, 3,4-di-n-propylpyrrole, 3,4-didodecylpyrrole, 3,4-dipropoxypyrrole, 3,4-difurylpyrrole, N-methylpyrrole, N-ethylpyrrole, N-n-propylpyrrole, N-n-butylpyrrole, N-phenylpyrrole, N-(p-tolyl)pyrrole, 3-chloropyrrole, 3-bromopyrrole, 3-iodopyrrole, 3,4-dichloropyrrole, 3,4-dibromopyrrole, and 3,4-diiodopyrrole.

3. The film of polypyrrole as claimed in claim 1, wherein said transition metal complex anion is selected from the group consisting of a cobalt complex anion, a chrome complex anion, a manganese complex anion, an iron complex anion, a titanium complex anion, a copper complex anion, a molybdenum complex anion, and a tungsten complex anion.

4. The film of polypyrrole as claimed in claim 3, wherein said cobalt complex anion is selected from the group consisting of Co(CN)$_6^{3-}$, Co(edta)$^-$ (edta: ethylenediamine-tetraacetate), Co(pdta)$^-$ (pdta: propylenediamine-tetra-acetate), Co(cydta)$^-$ (cydta: 1,2-cyclohexanediamine-N,N,N',N'-tetraacetate), Co(tnta)$^-$ (tnta: trimethylene-diaminetetraacetate), Co(ata)(CO$_3$)$^{2-}$, (ata: nitrilo-triacetate), Co(gly)(ata)$^-$ (gly: glycine), CoCl(edta)$^{2-}$, Co(NO$_2$)(edta)$^{2-}$, Co(edta)(ox)$^-$, Co(edtp)$^-$ (edtp: ethylenediaminetetrapropionate), Co(tnta)$^-$ (tnta: trimethylenediaminetetraacetate), Co(glygly)$^{2-}$ (glygly: glycylglycinate), Co(mal)$_3^{3-}$ and Co(dtpa)$^{2-}$ (dtpa: diethylenetriaminepentaacetate).

5. The film of polypyrrole as claimed in claim 3, wherein said chrome complex anion is selected from the group consisting of Cr(CN)$_6^{3-}$, Cr(ox)$_3^{3-}$ (ox: oxalate), Cr(edta)$^-$ (edta: ethylenediaminetetraacetate), and Cr(mal)$_3^{3-}$ (mal: malonate).

6. The film of polypyrrole as claimed in claim 3, wherein said manganese complex anion is selected from the group consisting of Mn(edta)$^-$ (edta: ethylenediaminetetraacetate), and Mn(CN)$_6^{3-}$.

7. The film of polypyrrole as claimed in claim 3, wherein said iron complex anion is selected from the group consisting of Fe(edta)$^-$ (edta: ethylenediaminetetraacetate), Fe(cat)$_3^{3-}$ (cat: catecholate), and Fe(CN)$_6^{3-}$.

8. The film of polypyrrole as claimed in claim 4, wherein said titanium complex anion is Ti(cat)$_3^{2-}$ (cat: catecholate).

9. The film of polypyrrole as claimed in claim 4, wherein said copper complex anion is selected from the group consisting of Cu(pdta)$^{2-}$ (pdta: propylenediaminetetraacetate), and Cu(glygly)$^{2-}$ (glygly: glycylglycinate).

10. The film of polypyrrole as claimed in claim 4, wherein said molybdenum complex anion is Mo(CN)$_8^{3-}$.

11. The film of polypyrrole as claimed in claim 4, wherein said tungsten complex anion is selected the group consisting of W(CN)$_8^{3-}$ and WCl$_{5-}$.

12. A method of producing a polypyrrole film by electrochemically polymerizing pyrrole or a mixture of pyrrole and a pyrrole derivative by anodic oxidation so as to deposit a polypyrrole on an anode in the presence of a transition metal complex anion having a higher oxidation number of a redox couple consisting of transition metal complex anions.

13. The method of producing a polypyrrole film as claimed in claim 12, wherein said pyrrole derivative is selected from the group consisting of 3-methylpyrrole, 3-ethylpyrrole, 3-n-propylpyrrole, 3-n-butylpyrrole, 3-decylpyrrole, 3-benzylpyrrole, 3-cyclohexylpyrrole, 3-methoxypyrrole, 3-ethoxypyrrole, 3,4-dimethylpyrrole, 3,4-diethylpyrrole, 3,4-di-n-propylpyrrole, 3,4-didodecylpyrrole, 3,4-dipropoxypyrrole, 3,4-difurylpyrrole, N-methylpyrrole, N-ethylpyrrole, N-n-propylpyrrole, N-n-butylpyrrole, N-phenylpyrrole, N-(p-tolyl)pyrrole, 3-chloropyrrole, 3-bromopyrrole, 3-iodopyrrole, 3,4-dichloropyrrole, 3,4-dibromopyrrole, and 3,4-diiodopyrrole.

14. The method of producing a polypyrrole film as claimed in claim 12, wherein said transition metal complex anion is selected from the group consisting of a cobalt complex anion, a chrome complex anion, a manganese complex anion, an iron complex anion, a titanium complex anion, a copper complex anion, a molybdenum complex anion, and a tungsten complex anion.

15. The method of producing a polypyrrole film as claimed in claim 12, wherein said transition metal complex anion is a cobalt complex anion selected from the group consisting of $Co(CN)_6^{3-}$, $Co(edta)^-$ (edta: ethylenediaminetetraacetate), $Co(pdta)^-$ (pdta: propylenediaminetetraacetate), $Co(cydta)^-$ (cydta: 1,2-cyclohexanediamine-N,N,N',N'-tetraacetate), $Co(tnta)^-$ (tnta: trimethylenediaminetetraacetate), $Co(ata)(CO_3)^{2-}$ (ata: nitrilotriacetate), $Co(gly)(ata)^-$ (gly: glycine), $CoCl(edta)^{2-}$, $Co(NO_2)(edta)^{2-}$, $Co(edta)(ox)^-$, $Co(edtp)^-$ (edtp: ethylenediaminetetrapropionate), $Co(tnta)^-$ (tnta: trimethylenediaminetetraacetate), $Co(glygly)^{2-}$ (glygly: glycylglycinate), $Co(mal)_3^{3-}$ and $Co(dtpa)^{2-}$ (dtpa: diethylenetriaminepentaacetate).

16. The method of producing a polypyrrole film as claimed in claim 12, wherein said transition metal complex anion is a chrome complex anion selected from the group consisting of $Cr(CN)_6^{3-}$, $Cr(ox)_3^{3-}$ (ox: oxalate), $Cr(edta)^-$ (edta: ethylenediaminetetraacetate), and $Cr(mal)_3^{3-}$ (mal: malonate).

17. The method of producing a polypyrrole film as claimed in claim 12, wherein said anode is partially provided at the surface thereof with a material having a smaller electric resistivity than the electric resistivity of said anode.

18. A method of producing an electroconductive polypyrrole film by electrochemically polymerizing pyrrole or a mixture of pyrrole and a pyrrole derivative by anodic oxidation in the presence of a tris(oxalato)chromate ion, $Cr(ox)_3^{3-}$ (ox: oxalate), in an aqueous solution, with the potential of an anode being regulated by a reference electrode, said pyrrole derivative being selected from the group consisting of 3-methylpyrrole, 3-ethylpyrrole, 3-n-propylpyrrole, 3-n-butylpyrrole, 3-decylpyrrole, 3-benzylpyrrole, 3-cyclohexylpyrrole, 3-methoxypyrrole, 3-ethoxypyrrole, 3,4-dimethylpyrrole, 3,4-diethylpyrrole, 3,4-di-n-propylpyrrole, 3,4-didodecylpyrrole, 3,4-dipropoxypyrrole, 3,4-difurylpyrrole, N-methylpyrrole, N-ethylpyrrole, N-n-propylpyrrole, N-n-butylpyrrole, N-phenylpyrrole, N-(p-tolyl)pyrrole, 3-chloropyrrole, 3-bromopyrrole, 3-iodopyrrole, 3,4-dichloropyrrole, 3,4-dibromopyrrole, and 3,4-diiodopyrrole.

19. The method of producing an electroconductive polypyrrole film as claimed in claim 18, wherein said anodic oxidation is performed at temperatures between 0° C. and the freezing point of said aqueous solution.

20. A secondary battery comprising a cathode system in which a cathode comprises a polypyrrole film doped with a transition metal complex anion having a higher oxidation number of a redox couple consisting of transition metal complex anions.

* * * * *